(12) United States Patent
Goto

(10) Patent No.: US 11,713,046 B2
(45) Date of Patent: Aug. 1, 2023

(54) DRIVING ASSISTANCE APPARATUS AND DATA COLLECTION SYSTEM

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 227 days.

(21) Appl. No.: 17/188,292

(22) Filed: Mar. 1, 2021

(65) Prior Publication Data

US 2021/0309232 A1 Oct. 7, 2021

(30) Foreign Application Priority Data

Apr. 2, 2020 (JP) ................................ 2020-066464

(51) Int. Cl.
*B60W 40/08* (2012.01)
*B60W 40/04* (2006.01)
*B60W 50/14* (2020.01)
*G06V 20/59* (2022.01)

(52) U.S. Cl.
CPC ............ *B60W 40/08* (2013.01); *B60W 40/04* (2013.01); *B60W 50/14* (2013.01); *G06V 20/597* (2022.01); *B60W 2540/22* (2013.01)

(58) Field of Classification Search
CPC ...... B60W 40/08; B60W 40/04; B60W 50/14; B60W 2540/22; B60W 2554/802; B60W 2554/804; B60W 2556/50; B60W 30/0956; G06V 20/597; G06V 20/58; G06V 40/174; G06V 40/193; G06V 40/168
See application file for complete search history.

(56) References Cited

U.S. PATENT DOCUMENTS

| 2016/0163198 | A1* | 6/2016 | Dougherty | G08G 1/162 340/905 |
| 2017/0225677 | A1* | 8/2017 | Yoshida | A61B 5/6893 |
| 2018/0330178 | A1* | 11/2018 | el Kaliouby | B60W 50/082 |
| 2019/0094034 | A1* | 3/2019 | Aist | G01C 21/3415 |
| 2020/0394920 | A1* | 12/2020 | Suzuno | G08G 1/0962 |

FOREIGN PATENT DOCUMENTS

| DE | 112015000123 T5 * | 6/2016 | ............ G01C 21/26 |
| JP | 2007-065997 A | 3/2007 | |
| JP | 2018-097457 A | 6/2018 | |

* cited by examiner

*Primary Examiner* — Aniss Chad
*Assistant Examiner* — Nikki Marie M Molina
(74) *Attorney, Agent, or Firm* — McDermott Will & Emery LLP

(57) ABSTRACT

A driving assistance apparatus includes a first emotion estimating unit, a second emotion estimating unit, a storage, and a notification controller. The first emotion estimating unit is configured to estimate an emotion of a driver of a vehicle. The second emotion estimating unit is configured to estimate an emotion of a traffic participant around the vehicle. The storage is configured to store data on a first location where the driver of the vehicle has felt no danger and the traffic participant has felt danger from the vehicle. The notification controller is configured to notify the driver of the stored data on the first location.

10 Claims, 9 Drawing Sheets

DRIVING ASSISTANCE APPARATUS AND DATA COLLECTION SYSTEM

CROSS-REFERENCE TO RELATED APPLICATIONS

The present application claims priority from Japanese Patent Application No. 2020-066464 filed on Apr. 2, 2020, the entire contents of which are hereby incorporated by reference.

BACKGROUND

The technology relates to a driving assistance apparatus and a data collection system.

During driving of a vehicle, the vehicle sometimes encounters a risk situation that is one step away from an accident and makes a driver or an occupant anxious. A technique has been proposed that reduces accidents and improves a feeling of safety by collecting information on locations where a vehicle has encountered such a risk situation (hereinafter, also referred to as "near-miss incident location"), and providing the information on the near-miss incident locations to the vehicle.

For example, Japanese Unexamined Patent Application Publication (JP-A) No. 2018-097457 discloses the following driving assistance information collection apparatus. In the driving assistance information collection apparatus, a driving characteristic processor reads data from a driving characteristic database, and registers a location where an acceleration rate is greater than an acceleration rate threshold set for each driver, as a near-miss incident location, in a near-miss incident location database. A road characteristic processor reads data from the driving characteristic database, and registers a location where the acceleration rate is greater than an acceleration rate threshold set for each location with the same road characteristic, as a near-miss incident location, in the near-miss incident location database. A near-miss incident similar location generator extracts a location similar to the near-miss incident location by referring to a map database, and registers the location in the near-miss incident location database.

JP-A No. 2007-065997 discloses the following vehicle data collection apparatus. In the vehicle data collection apparatus, a biological sensor acquires biological reaction data of a driver. An operation history recording unit records contents of a vehicle operation as operation history information. An information input unit acquires obstacle presence/absence information and obstacle distance information from a peripheral monitoring camera, an ultrasonic sensor, and a radar. If a distance between the own vehicle and an obstacle indicated by the information acquired by the information input unit becomes equal to or less than a preset threshold, a driving assistance controller recognizes this as an abnormality approach event. In a case where the biological reaction data falls within a stability range at a point in time of the recognition, the driving assistance controller records the operation history information and vehicle position information from a car navigation apparatus obtained at the point in time, as weak point information associated with each other.

SUMMARY

An aspect of the technology provides a driving assistance apparatus including a first emotion estimating unit, a second emotion estimating unit, a storage, and a notification controller. The first emotion estimating unit is configured to estimate an emotion of a driver of a vehicle. The second emotion estimating unit is configured to estimate an emotion of a traffic participant around the vehicle. The storage is configured to store data on a first location where the driver of the vehicle has felt no danger and the traffic participant has felt danger from the vehicle. The notification controller is configured to notify the driver of the stored data on the first location.

An aspect of the technology provides a data collection system including a driving assistance apparatus and a management server. The driving assistance apparatus is to be mounted in a vehicle. The management server is configured to communicate with the driving assistance apparatus. The driving assistance apparatus includes a first emotion estimating unit, a second emotion estimating unit, a storage, and a first communicator. The first emotion estimating unit is configured to estimate an emotion of a driver of the vehicle. The second emotion estimating unit is configured to estimate an emotion of a traffic participant around the vehicle. The storage is configured to store data on a first location where the driver of the vehicle has felt no danger and the traffic participant has felt danger from the vehicle. The first communicator is configured to transmit the data on the first location. The management server includes a data memory and a second communicator. The data memory is configured to accumulate the data on the first location transmitted from the driving assistance apparatus. The second communicator is configured to transmit the data on the first location accumulated in the data memory to the driving assistance apparatus.

An aspect of the technology provides a driving assistance apparatus including circuitry and a storage. The circuitry is configured to estimate an emotion of a driver of a vehicle, and estimate an emotion of a traffic participant around the vehicle. The storage is configured to store data on a first location where the driver of the vehicle has felt no danger and the traffic participant has felt danger from the vehicle. The circuitry is further configured to notify the driver of the stored data on the first location.

An aspect of the technology provides a data collection system including a driving assistance apparatus and a management server. The driving assistance apparatus is to be mounted in a vehicle. The management server is configured to communicate with the driving assistance apparatus. The driving assistance apparatus includes circuitry, a storage, and a first communicator. The circuitry is configured to estimate an emotion of a driver of the vehicle, and estimate an emotion of a traffic participant around the vehicle. The storage is configured to store data on a first location where the driver of the vehicle has felt no danger and the traffic participant has felt danger from the vehicle. The first communicator is configured to transmit the data on the first location. The management server includes a data memory and a second communicator. The data memory is configured to accumulate the data on the first location transmitted from the driving assistance apparatus. The second communicator is configured to transmit the data on the first location accumulated in the data memory to the driving assistance apparatus.

BRIEF DESCRIPTION OF THE DRAWINGS

The accompanying drawings are included to provide a further understanding of the disclosure and are incorporated in and constitute a part of this specification. The drawings

DETAILED DESCRIPTION

In the driving assistance information collection apparatus disclosed in JP-A No. 2018-097457, the location where the acceleration rate is greater than the threshold set for each driver is registered as the near-miss incident location. In the vehicle data collection apparatus disclosed in JP-A No. 2007-065997, information on a location where the driver has not recognized a risk situation is recorded as the weak point information on the precondition that the distance between the own vehicle and the obstacle has become equal to or less than the threshold. However, even in a case where the driver does not notice a risk situation, a passenger, an occupant of another vehicle, or a pedestrian looking at the own vehicle from outside the vehicle, for example, sometimes feels danger on the basis of his/her viewpoint or sensation.

For example, in a case where a person riding a bicycle is present at a blind spot of a vehicle that is about to make a left turn, a driver often does not notice a risk situation in a situation where the driver makes a left turn without noticing the bicycle and the bicycle makes a sudden stop. In addition, when a vehicle travels on a narrow road in a residential area, a passenger feels fear in some cases, even though a driver does not feel fear. The techniques disclosed in JP-A No. 2018-097457 and JP-A No. 2007-065997 collect information on near-miss incident locations by focusing on the viewpoint or sensation of the driver or the distance to the obstacle. This makes it difficult to provide, to a vehicle, a location where a traffic participant other than the driver feels danger on the basis of his/her viewpoint or sensation. In other words, it is difficult to collect useful data information.

It is desirable to provide a driving assistance apparatus and a data collection system that make it possible to collect useful data information.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
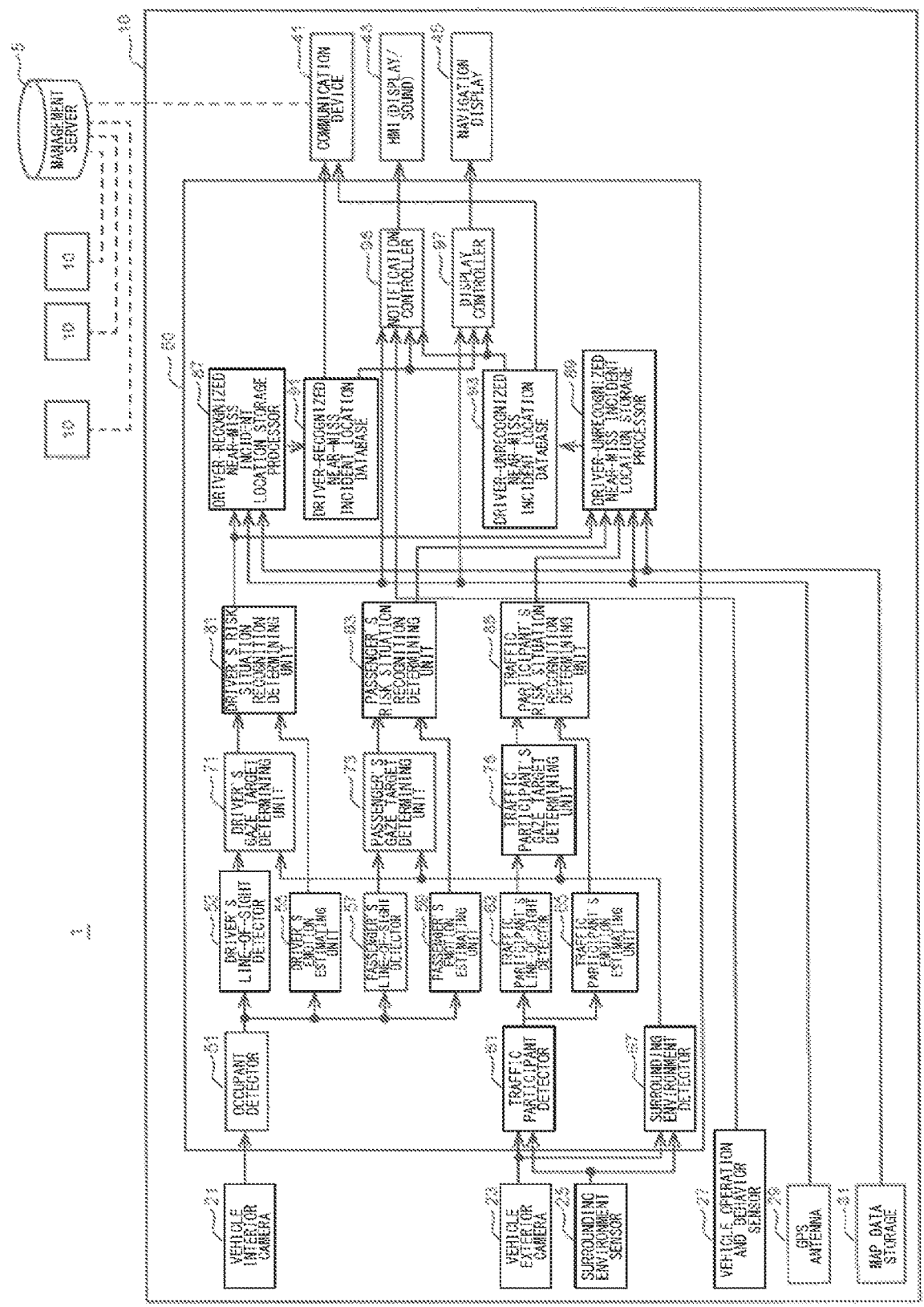
FIG. 1 is a block diagram illustrating an example configuration of a data collection system according to one example embodiment of the technology.

Described first is an example configuration of a data collection system according to an example embodiment of the technology. FIG. 1 is a block diagram illustrating an example configuration of a data collection system 1 according to an example embodiment of the technology.

The data collection system 1 may include a driving assistance apparatus 10 to be mounted in a vehicle, and a management server 5 coupled to the driving assistance apparatus 10 to be able to communicate with the driving assistance apparatus 10. The driving assistance apparatus 10 may be mounted in one or more vehicles that use the data collection system 1. In the data collection system 1, the management server 5 may accumulate information on a near-miss incident location (hereinafter also referred to as "near-miss incident location information") collected by the driving assistance apparatus 10 mounted in each of the vehicles, and provide the near-miss incident location information to the driving assistance apparatus 10 of each vehicle. The driving assistance apparatus 10 that has received the near-miss incident location information from the management server 5 may notify a driver of the vehicle of the near-miss incident location information. This reduces the possibility of occurrence of an accident, and improves a feeling of safety about road traffic.

For example, in the data collection system 1 according to the example embodiment, information on a near-miss incident location where the driver of each of the vehicles has felt no danger whereas a surrounding traffic participant has felt danger from the vehicle (hereinafter, also referred to as "driver-unrecognized near-miss incident location") is collected, and the driver of the vehicle is notified of the information on the driver-unrecognized near-miss incident location. This enables, even at a near-miss incident location where it is difficult for the driver him/herself to recognize a risk situation, the driver of each vehicle to direct attention when passing through the location where another traffic participant has felt danger. This makes it possible to further reduce the possibility of occurrence of an accident, and further improve the feeling of safety about road traffic.

[1. Example Configuration of Driving Assistance Apparatus]

Now, an example configuration of the driving assistance apparatus 10 will be described in detail.

The driving assistance apparatus 10 may be configured as an apparatus that is mounted in a vehicle, collects information on near-miss incident locations where danger is felt in relation to travel of the vehicle, and notifies a driver of the near-miss incident location information.

The driving assistance apparatus 10 may include a vehicle interior camera 21, a vehicle exterior camera 23, a surrounding environment sensor 25, a vehicle operation and behavior sensor 27, a GPS antenna 29, a map data storage 31, a communication device 41, a human machine interface (HMI) 43, a navigation display 45, and an information processing device 50. The vehicle interior camera 21, the vehicle exterior camera 23, the surrounding environment sensor 25, the GPS antenna 29, the map data storage 31, the communication device 41, the HMI 43, and the navigation display 45 may each be coupled to the information processing device 50 in a direct manner or in an indirect manner via a communication system such as a controller area network (CAN) or a local interconnect network (LIN), for example.

[1-1. Vehicle Inside Imaging Camera]

The vehicle interior camera 21 may generate image data by capturing an image of the inside of a vehicle compartment. For example, the vehicle interior camera 21 may include an image sensor such as a charge coupled device (CCD) or a complementary metal oxide semiconductor (CMOS). The vehicle interior camera 21 may transmit the generated image data to the information processing device 50. The vehicle interior camera 21 may be installed such that at least the driver out of one or more occupants in the vehicle compartment falls within an imaging range. In a case of determining whether a passenger has felt danger, the vehicle interior camera 21 may be installed such that the passenger seated in a passenger seat or rear seats also falls within the imaging range. Only one vehicle interior camera 21 may be provided, or two or more vehicle interior cameras 21 may be provided.

[1-2. Vehicle Outside Imaging Camera]

The vehicle exterior camera 23 may generate image data by capturing an image of surroundings of the vehicle. The vehicle exterior camera 23 may be installed for safety of the vehicle, or may be installed for collection of near-miss incident location information. The vehicle exterior camera 23 may include an image sensor such as a CCD or a CMOS, as with the vehicle interior camera 21. The vehicle exterior camera 23 may transmit the generated image data to the information processing device 50. The vehicle exterior camera 23 may include one or more cameras provided for the vehicle to be able to capture an image in at least any direction out of the front, the left or right side, and the rear of the vehicle.

[1-3. Surrounding Environment Sensor]

The surrounding environment sensor 25 may be a sensor that detects a person or an obstacle around the vehicle. The surrounding environment sensor 25 may include, for example, one or more of a high-frequency radar sensor, an ultrasonic sensor, and a LiDAR. The obstacle to be detected may include any object present around the vehicle, such as another vehicle, a bicycle, a building, a traffic sign, a traffic light, or a natural object.

[1-4. Vehicle Operation and Behavior Sensor]

The vehicle operation and behavior sensor 27 may include one or more sensors that detect an operation state and a behavior of the vehicle. The vehicle operation and behavior sensor 27 may detect information on the behavior of the vehicle, such as a vehicle speed, an acceleration rate, or a yaw rate. For example, the vehicle operation and behavior sensor 27 may include one or more of an engine revolution number sensor, a vehicle speed sensor, an acceleration rate sensor, and an angular speed sensor. The vehicle operation and behavior sensor 27 may also detect information on the operation state of the vehicle, such as an acceleration operation amount, a brake operation amount, or a steering rudder angle. For example, the vehicle operation and behavior sensor 27 may include one or more of an accelerator position sensor, a brake stroke sensor, and a rudder angle sensor. The vehicle operation and behavior sensor 27 may transmit the detected information to the information processing device 50.

[1-5. GPS Antenna]

The GPS antenna 29 may receive satellite signals from global positioning system (GPS) satellites. The GPS antenna 29 may transmit, to the information processing device 50, position information of the vehicle on map data included in the received satellite signal. Note that, in place of the GPS antenna 29, an antenna may be provided to receive satellite signals from another satellite system that specifies a position of the vehicle.

[1-6. Communication Device]

The communication device 41 may be an interface for the information processing device 50 to communicate with the management server 5 via a communication system such as a mobile communication network. The communication device 41 may include an interface supporting standards of the communication system. In one embodiment, the communication device 41 may serve as a "first communicator".

[1-7. HMI]

The HMI 43 may be controlled by the information processing device 50 to notify the occupant of the vehicle of various pieces of information by displaying an image or outputting sound, for example. For example, the HMI 43 may include a display and a speaker provided on an instrument panel.

[1-8. Navigation Display]

The navigation display 45 may display the map data. The navigation display 45 may be controlled by the information processing device 50 to reflect and display, on the map data, collected data on a driver-recognized near-miss incident location and data on the driver-unrecognized near-miss incident location. For example, the navigation display 45 may include an optical panel such as a liquid crystal panel. The navigation display 45 may be a part of the HMI 43.

[1-9. Information Processing Device]

The information processing device 50 may include, for example, an arithmetic processing unit, such as a central processing unit (CPU) or a micro-processing unit (MPU), and an image processing unit, such as a graphic processing unit (GPU). The arithmetic processing unit may execute programs stored in a memory to conduct various kinds of calculation processes. Note that a portion or the entirety of the information processing device 50 may be an updatable software such as a firmware, or a program module to be executed in response to a command from the CPU, for example.

In the example embodiment, the information processing device 50 may include an occupant detector 51, a traffic participant detector 61, and a surrounding environment detector 67. The information processing device 50 may also include a driver's line-of-sight detector 53, a driver's emotion estimating unit 55, a passenger's line-of-sight detector 57, a passenger's emotion estimating unit 59, a traffic participant's line-of-sight detector 63, and a traffic participant's emotion estimating unit 65. The information processing device 50 may also include a driver's gaze target determining unit 71, a driver's risk situation recognition determining unit 81, a passenger's gaze target determining unit 73, a passenger's risk situation recognition determining unit 83, a traffic participant's gaze target determining unit 75, and a traffic participant's risk situation recognition determining unit 85. The information processing device 50 may also include a driver-recognized near-miss incident location storage processor 87 and a driver-unrecognized near-miss incident location storage processor 89. The information processing device 50 may also include a notification controller 95 and a display controller 97. These units included in the information processing device 50 may be, for example, implemented by programs executed by the arithmetic processing unit or the image processing unit.

Furthermore, the information processing device 50 may include a driver-recognized near-miss incident location database 91 and a driver-unrecognized near-miss incident location database 93. These databases may include a memory, such as a random access memory (RAM), serving as a storage, or a storage medium, such as a hard disk drive (HDD), a compact disc (CD), a digital versatile disc (DVD), a solid state drive (SSD), a universal serial bus (USB) flash drive, or a storage device. In one embodiment, the driver-unrecognized near-miss incident location database 93 may serve as a "storage".

In addition, the information processing device 50 may include an unillustrated memory, such as a RAM or a read only memory (ROM), that stores a software program to be executed by the arithmetic processing unit or the image processing unit, various parameters to be used in the calculation process, acquired information, or a calculation result, for example.

[1-9-1. Occupant Detector]

The occupant detector 51 may detect the occupant of the vehicle, on the basis of the image data transmitted from the vehicle interior camera 21. In one example, the occupant detector 51 may detect the occupant of the vehicle by performing image processing on the image data transmitted from the vehicle interior camera 21, and specifying the presence of a person's face. The occupant detector 51 may also specify a seat position of the detected occupant on the basis of the image data transmitted from the vehicle interior camera 21, and determine whether the detected occupant is the driver or a passenger. The occupant detector 51 may distinguish between the detected individual occupants by using a technique such as feature analysis of a facial image.

[1-9-2. Traffic Participant Detector]

The traffic participant detector 61 may detect a traffic participant around the vehicle, on the basis of the image data transmitted from the vehicle exterior camera 23. In one example, the traffic participant detector 61 may detect the traffic participant by performing image processing on the image data transmitted from the vehicle exterior camera 23, and specifying the presence of a person's face present around the vehicle. Examples of the traffic participant may include a pedestrian, a person riding a bicycle, and an occupant of another vehicle. The traffic participant detector 61 may detect and classify the traffic participants into a pedestrian, a person riding a bicycle, and an occupant of another vehicle, for example.

[1-9-3. Surrounding Environment Detector]

The surrounding environment detector 67 may detect information on a surrounding environment of the vehicle (hereinafter also referred to as "vehicle surrounding environment information"), on the basis of the image data transmitted from the vehicle exterior camera 23 and the information transmitted from the surrounding environment sensor 25. In one example, the surrounding environment detector 67 may perform image processing on the image data transmitted from the vehicle exterior camera 23. The surrounding environment detector 67 may thereby specify a person, another vehicle, a bicycle, a building, or a natural object, for example, present around the vehicle by using a technique of object detection, and calculate positions of such objects with respect to the vehicle and a distance or a relative speed between the vehicle and such objects.

The surrounding environment detector 67 may specify a part of the vehicle surrounding environment information by acquiring information transmitted from a device outside the vehicle via a communication system, such as vehicle-to-vehicle communication, road-to-vehicle communication, or a mobile communication network. The surrounding environment detector 67 may specify a part of the vehicle surrounding environment information by specifying the position of the vehicle on the map data by using the position information of the vehicle acquired by the GPS antenna 29.

[1-9-4. Driver's Line-Of-Sight Detector]

In a case where the driver has been detected, the driver's line-of-sight detector 53 may detect the driver's line-of-sight, on the basis of the image data transmitted from the vehicle interior camera 21. In one example, the driver's line-of-sight detector 53 may detect the line-of-sight by performing image processing on the image data transmitted from the vehicle interior camera 21, and specifying a face direction and an eye direction of the detected driver.

[1-9-5. Driver's Emotion Estimating Unit]

In a case where the driver has been detected, the driver's emotion estimating unit 55 may estimate the driver's emotion, on the basis of the image data transmitted from the vehicle interior camera 21. In one example, the driver's emotion estimating unit 55 may estimate the driver's emotion by analyzing facial expression data of the driver by using a technique of facial expression analysis based on the FACS theory, for example. The emotion may be estimated, for example, on the basis of a level defined for each type of emotion, such as happiness, anger, sorrow, or pleasure. In the example embodiment, the driver's emotion estimating unit 55 may estimate at least a negative emotion, such as fear or surprise, of the driver. The emotion may be estimated by another technique. In one embodiment, the driver's emotion estimating unit 55 may serve as a "first emotion estimating unit".

[1-9-6. Passenger's Line-Of-Sight Detector]

In a case where a passenger other than the driver has been detected, the passenger's line-of-sight detector 57 may detect the passenger's line-of-sight, on the basis of the image data transmitted from the vehicle interior camera 21. In one example, the passenger's line-of-sight detector 57 may detect the line-of-sight by performing image processing on the image data transmitted from the vehicle interior camera 21, and specifying a face direction and an eye direction of the detected passenger.

[1-9-7. Passenger's Emotion Estimating Unit]

In a case where a passenger other than the driver has been detected, the passenger's emotion estimating unit 59 may estimate the passenger's emotion, on the basis of the image data transmitted from the vehicle interior camera 21. In one example, the passenger's emotion estimating unit 59 may estimate the passenger's emotion by analyzing facial expression data of the passenger by using a technique of facial expression analysis based on the FACS theory, for example. The emotion may be estimated, for example, on the basis of a level defined for each type of emotion, such as happiness, anger, sorrow, or pleasure. In the example embodiment, the passenger's emotion estimating unit 59 may estimate at least a negative emotion, such as fear or surprise, of the passenger. The emotion may be estimated by another technique. In one embodiment, the passenger's emotion estimating unit 59 may serve as a "third emotion estimating unit".

[1-9-8. Traffic Participant's Line-Of-Sight Detector]

In a case where a traffic participant around the vehicle has been detected, the traffic participant's line-of-sight detector 63 may detect the traffic participant's line-of-sight, on the basis of the image data transmitted from the vehicle exterior camera 23. In one example, the traffic participant's line-of-sight detector 63 may detect the line-of-sight by performing image processing on the image data transmitted from the vehicle exterior camera 23, and specifying a face direction and an eye direction of the detected traffic participant.

[1-9-9. Traffic Participant's Emotion Estimating Unit]

In a case where a traffic participant around the vehicle has been detected, the traffic participant's emotion estimating unit 65 may estimate the traffic participant's emotion, on the basis of the image data transmitted from the vehicle exterior camera 23. In one example, the traffic participant's emotion estimating unit 65 may estimate the traffic participant's emotion by analyzing facial expression data of the traffic participant by using a technique of facial expression analysis based on the FACS theory, for example. The emotion may be estimated, for example, on the basis of a level defined for each type of emotion, such as happiness, anger, sorrow, or pleasure. In the example embodiment, the traffic participant's emotion estimating unit 65 may estimate at least a negative emotion, such as fear or surprise, of the traffic participant. The emotion may be estimated by another technique. In one embodiment, the traffic participant's emotion estimating unit 65 may serve as a "second emotion estimating unit".

[1-9-10. Driver's Gaze Target Determining Unit]

In a case where the driver has been detected, the driver's gaze target determining unit 71 may determine a target gazed at by the driver. In one example, the driver's gaze target determining unit 71 may determine the gaze target present in the driver's line-of-sight, on the basis of a direction of the driver's line-of-sight detected by the driver's line-of-sight detector 53 and the vehicle surrounding environment information detected by the surrounding environment detector 67. Information on the gaze target may include information on not only a person or an obstacle, for example, that is present, but also a distance or a relative speed between the own vehicle and the person or the obstacle, for example. The driver's gaze target determining unit 71 may specify the gaze target present in the driver's line-of-sight by referring to the map data storage 31.

[1-9-11. Passenger's Gaze Target Determining Unit]

In a case where the passenger has been detected, the passenger's gaze target determining unit 73 may determine a target gazed at by the passenger. In one example, the passenger's gaze target determining unit 73 may determine the gaze target present in the passenger's line-of-sight, on the basis of a direction of the passenger's line-of-sight detected by the passenger's line-of-sight detector 57 and the vehicle surrounding environment information detected by the surrounding environment detector 67. Information on the gaze target may include information on not only a person or an obstacle, for example, that is present, but also a distance or a relative speed between the own vehicle and the person or the obstacle, for example. The passenger's gaze target determining unit 73 may specify the gaze target present in the passenger's line-of-sight by referring to the map data storage 31.

[1-9-12. Traffic Participant's Gaze Target Determining Unit]

In a case where a traffic participant around the vehicle has been detected, the traffic participant's gaze target determining unit 75 may determine a target gazed at by the traffic participant. In one example, the traffic participant's gaze target determining unit 75 may determine the gaze target present in the traffic participant's line-of-sight, on the basis of a direction of the traffic participant's line-of-sight detected by the traffic participant's line-of-sight detector 63 and the vehicle surrounding environment information detected by the surrounding environment detector 67. Information on the gaze target may include information on not only the own vehicle, another traffic participant, or an obstacle, for example, that is present, but also a distance or a relative speed between the traffic participant and the own vehicle. The traffic participant's gaze target determining unit 75 may specify the gaze target present in the traffic participant's line-of-sight by referring to the map data storage 31.

[1-9-13. Driver's Risk Situation Recognition Determining Unit]

In a case where the driver has been detected, the driver's risk situation recognition determining unit 81 may determine whether the driver has felt danger. In other words, the driver's risk situation recognition determining unit 81 may determine whether a near-miss incident that is one step away from collision of the vehicle and makes the driver feel danger has occurred. In one example, the driver's risk situation recognition determining unit 81 may determine that the driver has felt danger in a case where the driver's emotion estimated by the driver's emotion estimating unit 55 indicates fear or surprise and where a content of the driver's gaze target determined by the driver's gaze target determining unit 71 indicates a predetermined risk situation.

For example, the driver's risk situation recognition determining unit 81 may determine that the driver has recognized a risk situation if a distance between the vehicle and a person, an obstacle, or another vehicle, for example, around the vehicle becomes less than a predetermined distance corresponding to a relative speed between them, and the estimated driver's emotion accordingly changes to indicate fear or surprise in extremely short time. A situation to be determined as a near-miss incident is not limited to the above example, and appropriate conditions may be set in advance. Appropriate conditions may be set in advance also for conditions under which the driver's emotion is to be determined as indicating fear or surprise; for example, the determination may be made on the basis of a degree of or time taken for the change to an emotion of fear or surprise.

[1-9-14. Passenger's Risk Situation Recognition Determining Unit]

In a case where the passenger has been detected, the passenger's risk situation recognition determining unit 83 may determine whether the passenger has felt danger from the own vehicle. In other words, the passenger's risk situation recognition determining unit 83 may determine whether a near-miss incident that is one step away from collision of the vehicle and makes the passenger feel danger has occurred. In one example, the passenger's risk situation recognition determining unit 83 may determine that the passenger has felt danger in a case where the passenger's emotion estimated by the passenger's emotion estimating unit 59 indicates fear or surprise and where a content of the passenger's gaze target determined by the passenger's gaze target determining unit 73 indicates a predetermined risk situation. Whether the passenger has felt danger may be determined by the same method as the method used by the driver's risk situation recognition determining unit 81.

[1-9-15. Traffic Participant's Risk Situation Recognition Determining Unit]

In a case where the traffic participant has been detected, the traffic participant's risk situation recognition determining unit 85 may determine whether the traffic participant has felt danger from the own vehicle. In other words, the traffic participant's risk situation recognition determining unit 85 may determine whether a near-miss incident that makes the traffic participant feel danger from the own vehicle has occurred. In one example, the traffic participant's risk situation recognition determining unit 85 may determine that the traffic participant has felt danger in a case where the traffic participant's emotion estimated by the traffic participant's emotion estimating unit 65 indicates fear or surprise and where a content of the traffic participant's gaze target determined by the traffic participant's gaze target determining unit 75 indicates a predetermined risk situation attributed to the own vehicle.

For example, the traffic participant's risk situation recognition determining unit 85 may determine that the traffic participant has felt danger if a distance between the vehicle and the traffic participant or another vehicle or a bicycle, for example, ridden by the traffic participant becomes less than a predetermined distance corresponding to a relative speed between them, and the estimated traffic participant's emotion accordingly changes to indicate fear or surprise in extremely short time. A situation to be determined as a near-miss incident is not limited to the above example, and appropriate conditions may be set in advance. Appropriate conditions may be set in advance also for conditions under which the traffic participant's emotion is to be determined as indicating fear or surprise; for example, the determination may be made on the basis of a degree of or time taken for the change to an emotion of fear or surprise.

[1-9-16. Driver-Recognized Near-Miss Incident Location Storage Processor]

The driver-recognized near-miss incident location storage processor 87 may cause the driver-recognized near-miss incident location database 91 to store data on a near-miss incident location where it is determined by the driver's risk situation recognition determining unit 81 that the driver has felt danger (hereinafter, also referred to as "driver-recognized near-miss incident location"). In one example, in a case where it is determined by the driver's risk situation recognition determining unit 81 that the driver has felt danger, the driver-recognized near-miss incident location storage processor 87 may specify a traveling position of the vehicle on the map data on the basis of an output signal from the GPS antenna 29 and the map data storage 31, and cause the traveling position to be stored as the driver-recognized near-miss incident location. The driver-recognized near-miss incident location storage processor 87 may cause the data on each driver-recognized near-miss incident location to be stored together with information on a level of the fear or surprise felt by the driver.

[1-9-17. Driver-Unrecognized Near-Miss Incident Location Storage Processor]

The driver-unrecognized near-miss incident location storage processor 89 may cause the driver-unrecognized near-miss incident location database 93 to store data on the driver-unrecognized near-miss incident location where the driver has felt no danger whereas a traffic participant, a passenger, or both has felt danger. In one example, the driver-unrecognized near-miss incident location storage processor 89 may specify a traveling position of the vehicle on the map data on the basis of the output signal from the GPS antenna 29 and the map data storage 31, and cause the traveling position to be stored as the driver-unrecognized near-miss incident location if the following condition holds: a case where it is determined by the passenger's risk situation recognition determining unit 83 that the passenger has felt danger, a case where it is determined by the traffic participant's risk situation recognition determining unit 85 that the traffic participant has felt danger, or both.

Note that the driver-unrecognized near-miss incident location storage processor 89 may be configured, in a case where it is determined by the driver's risk situation recognition determining unit 81 that the driver has felt danger, not to cause the location to be stored as the driver-unrecognized near-miss incident location. Thus, the data on the driver-unrecognized near-miss incident location where the driver has not recognized danger whereas a passenger, a traffic participant, or both has felt danger from the vehicle may be accumulated in the driver-unrecognized near-miss incident location database 93. The driver-unrecognized near-miss incident location storage processor 89 may cause the data on each driver-unrecognized near-miss incident location to be stored together with information on a level of the fear or surprise felt by the passenger or the traffic participant.

[1-9-18. Notification Controller]

The notification controller 95 may control driving of the HMI 43 to notify the driver of the driver-unrecognized near-miss incident location stored in the driver-unrecognized near-miss incident location database 93. In one example, the notification controller 95 may provide notification to the driver before the vehicle travels through the driver-unrecognized near-miss incident location stored in the driver-unrecognized near-miss incident location database 93. For example, if the traveling position of the vehicle specified on the basis of the position information transmitted from the GPS antenna 29 approaches the driver-unrecognized near-miss incident location, the notification controller 95 may provide notification by a technique of producing voice or warning sound, displaying a warning, or both.

Only notification such as "A large number of accidents have occurred here. Please be careful in driving." has been provided to a vehicle traveling through a place where a traffic accident has actually occurred or where an accident is statistically likely to occur. In contrast, in the driving assistance apparatus 10 according to the example embodiment, notification may be provided as follows: "You are approaching a location where an accident difficult to notice is likely to occur. Please drive carefully looking behind and to both sides." Thus, even at a location where the driver him/herself has not ever felt danger, it is possible to attract the driver's attention when the vehicle travels through the location where a passenger or a traffic participant has ever felt danger from the vehicle driven by the driver him/herself.

The notification controller 95 may also notify the driver of the driver-recognized near-miss incident location stored in the driver-recognized near-miss incident location database 91, together with the driver-unrecognized near-miss incident location. This makes it possible to attract the driver's attention when the vehicle travels through a location where the driver him/herself has felt danger in the past. In this case, the notification controller 95 may provide notification of the driver-recognized near-miss incident location and notification of the driver-unrecognized near-miss incident location differently. For example, the notification controller 95 may vary contents of the voice, a type of the warning sound, or contents of the warning to be displayed. This enables the driver to recognize whether the near-miss incident location is a location where the driver him/herself has ever felt danger, and direct more attention to the driver-unrecognized near-miss incident location where the driver him/herself has felt no danger.

[1-9-19. Display Controller]

The display controller 97 may cause the driver-recognized near-miss incident location information and the driver-unrecognized near-miss incident location information to be displayed on the map data displayed on the navigation display. This enables the driver using a navigation system to recognize the driver-recognized near-miss incident location and the driver-unrecognized near-miss incident location by looking at a screen of the navigation display. In this case, the driver-recognized near-miss incident location and the driver-unrecognized near-miss incident location may be displayed differently.

Figure 2:
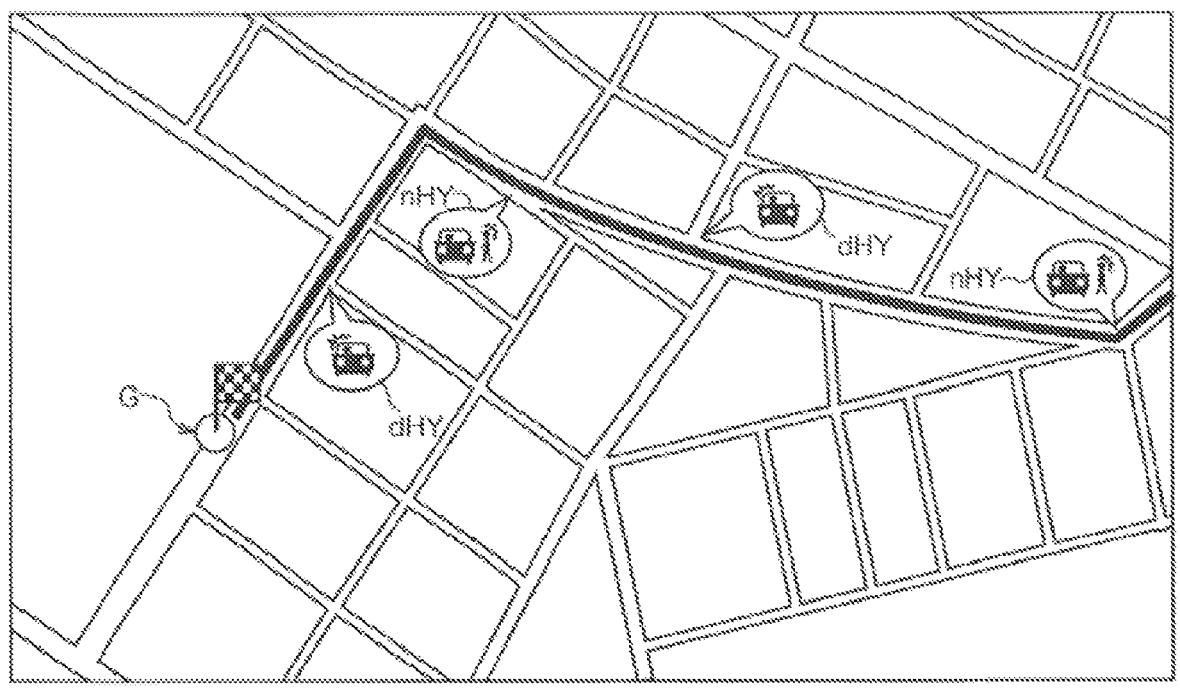
FIG. 2 is an explanatory diagram illustrating an example of what is displayed on a navigation display.

FIG. 2 illustrates an example of what is displayed on the navigation display. In the illustrated display example, in a case where the driver-recognized near-miss incident location stored in the driver-recognized near-miss incident location database 91 and the driver-unrecognized near-miss incident location stored in the driver-unrecognized near-miss incident location database 93 are present on a traveling route to a set destination G, icons indicating the respective near-miss incident locations may be displayed. An icon dHY indicating the driver-recognized near-miss incident location may be different from an icon nHY indicating the driver-unrecognized near-miss incident location stored in the driver-unrecognized near-miss incident location database 93. This enables the driver to recognize whether the near-miss incident location is a location where the driver him/herself has ever felt danger, and direct more attention to the driver-unrecognized near-miss incident location where the driver him/herself has felt no danger.

[2. Example Operation of Driving Assistance Apparatus]

Next, example operation of the driving assistance apparatus according to the example embodiment will be described in detail. Hereinafter, the operation of the driving assistance apparatus will be described by being broken down into a driver-recognized near-miss incident location storage process, a driver-unrecognized near-miss incident location storage process, and a notification control process.

[2-1. Driver-Recognized Near-Miss Incident Location Storage Process]

Figure 3:
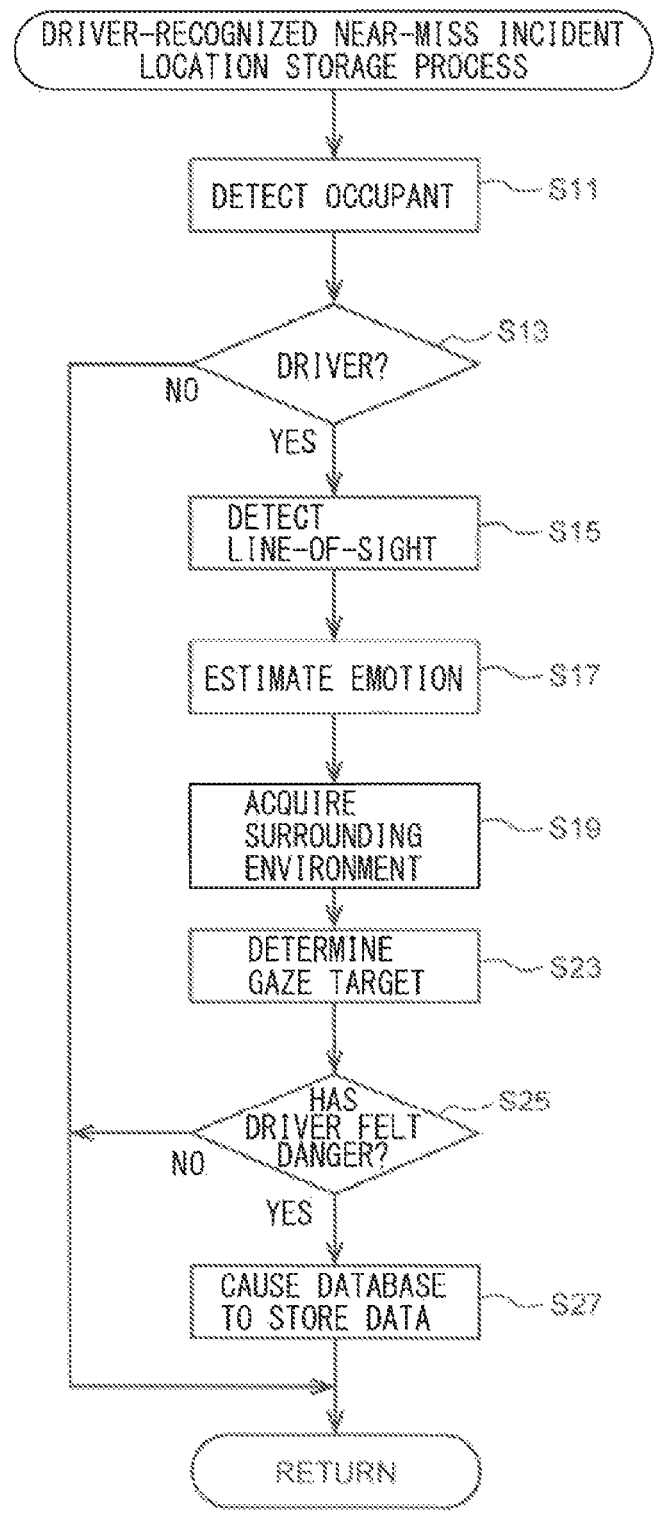
FIG. 3 is a flowchart illustrating operation of a driver-recognized near-miss incident location storage process performed by a driving assistance apparatus according to one example embodiment of the technology.

FIG. 3 is a flowchart illustrating operation of the driver-recognized near-miss incident location storage process.

First, the occupant detector 51 of the information processing device 50 may perform an occupant detection process, on the basis of the image data transmitted from the vehicle interior camera 21 (step S11). For example, the occupant detector 51 may detect the occupant by executing a known process of detecting a person's face. Thereafter, the occupant detector 51 may determine whether the detected occupant is the driver (step S13). Whether the detected occupant is the driver may be determined, for example, on the basis of the seat position of the detected occupant.

If the detected occupant is not the driver (S13/NO), the driver's line-of-sight detector 53 may end a routine of the driver-recognized near-miss incident location storage process. If the detected occupant is the driver (S13/YES), the driver's line-of-sight detector 53 may detect the driver's line-of-sight on the basis of the image data transmitted from the vehicle interior camera 21 (step S15). For example, the driver's line-of-sight detector 53 may detect the line-of-sight by specifying the face direction and the eye direction of the detected driver.

Thereafter, the driver's emotion estimating unit 55 may estimate the driver's emotion on the basis of the image data transmitted from the vehicle interior camera 21 (step S17). For example, the driver's emotion estimating unit 55 may analyze facial expression data of the driver by using a technique of facial expression analysis based on the FACS theory, and estimate at least a negative emotion, such as fear or surprise, of the driver.

Thereafter, the surrounding environment detector 67 may detect the vehicle surrounding environment information, on the basis of the image data transmitted from the vehicle exterior camera 23 and the information transmitted from the surrounding environment sensor 25 (step S19). For example, the surrounding environment detector 67 may specify a person, another vehicle, or an obstacle, for example, present around the vehicle by using a known technique of object detection, and calculate positions of such objects with respect to the vehicle and a distance or a relative speed between the vehicle and such objects.

Thereafter, the driver's gaze target determining unit 71 may determine the gaze target present in the driver's line-of-sight, on the basis of a direction of the driver's line-of-sight detected by the driver's line-of-sight detector 53 and the vehicle surrounding environment information detected by the surrounding environment detector 67 (step S23). Information on the gaze target may include information on not only a person or an obstacle, for example, that is present, but also a distance or a relative speed between the own vehicle and the person or the obstacle, for example.

Thereafter, the driver's risk situation recognition determining unit 81 may determine whether the driver has felt danger (step S25). For example, the driver's risk situation recognition determining unit 81 may determine that the driver has felt danger in a case where the driver's emotion estimated by the driver's emotion estimating unit 55 indicates a negative emotion and where a content of the driver's gaze target determined by the driver's gaze target determining unit 71 indicates a predetermined risk situation. For example, the driver's risk situation recognition determining unit 81 may determine that the driver has recognized a risk situation if a distance between the vehicle and a person, an obstacle, or another vehicle, for example, around the vehicle becomes less than a predetermined distance corresponding to a relative speed between them, and the estimated driver's emotion accordingly changes to indicate a negative emotion in extremely short time. A situation to be determined as a near-miss incident is not limited to the above example, and appropriate conditions may be set in advance. Appropriate conditions may be set in advance also for conditions under which the driver's emotion is to be determined as indicating a negative emotion; for example, the determination may be made on the basis of a degree of or time taken for the change to a negative emotion.

If it is not determined that the driver has felt danger (S25/NO), the driver-recognized near-miss incident location storage processor 87 may end the routine. If it is determined that the driver has felt danger (S25/YES), the driver-recognized near-miss incident location storage processor 87 may, on the basis of the output signal from the GPS antenna 29 and the map data storage 31, specify the traveling position of the vehicle on the map data where the driver is determined as having felt danger, and cause the driver-recognized near-miss incident location database 91 to store the traveling position as the driver-recognized near-miss incident location (step S27). The driver-recognized near-miss incident location storage processor 87 may cause the data on each driver-recognized near-miss incident location to be stored together with information on a level of the negative emotion felt by the driver.

The information processing device 50 may repeatedly execute the routine of step S11 to step S27 related to the driver-recognized near-miss incident location storage process described above. This enables the information processing device 50 to collect the information on the near-miss incident location where the driver has felt danger.

[2-2. Driver-Unrecognized Near-Miss Incident Location Storage Process]

Figure 4:
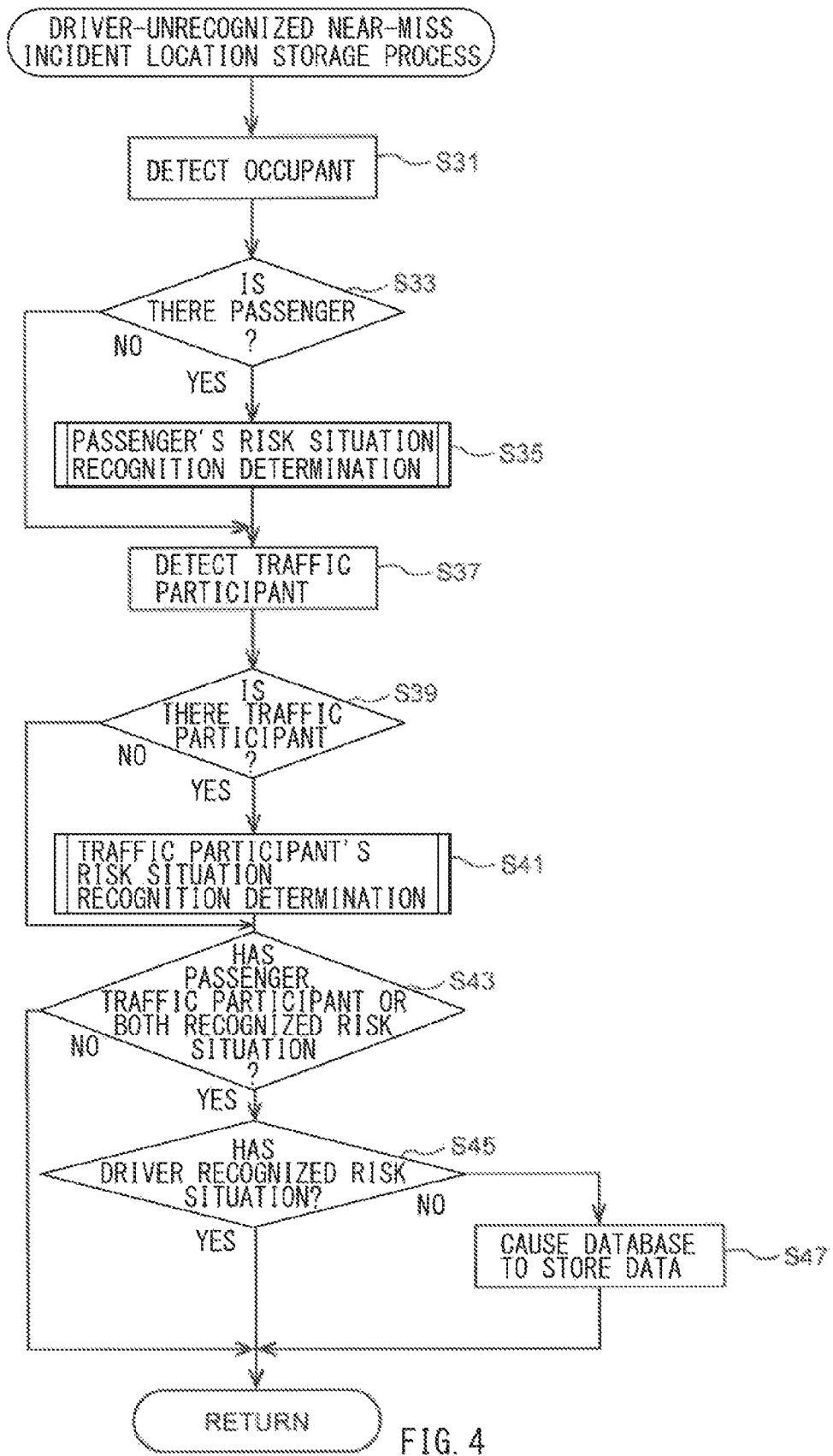
FIG. 4 is a flowchart illustrating operation of a driver-unrecognized near-miss incident location storage process performed by the driving assistance apparatus according to one example embodiment of the technology.

FIG. 4 is a flowchart illustrating operation of the driver-unrecognized near-miss incident location storage process.

First, as with step S11 described above, the occupant detector 51 of the information processing device 50 may perform the occupant detection process, on the basis of the image data transmitted from the vehicle interior camera 21 (step S31). Thereafter, the occupant detector 51 may determine whether the detected occupant is a passenger (step S33). Whether the detected occupant is a passenger may be determined, for example, on the basis of the seat position of the detected occupant.

If the detected occupant is not a passenger (S33/NO), the information processing device 50 may cause the process to proceed to step S37. If the detected occupant is a passenger (S33/YES), the information processing device 50 may execute a passenger's risk situation recognition determination process (step S35).

Figure 5:
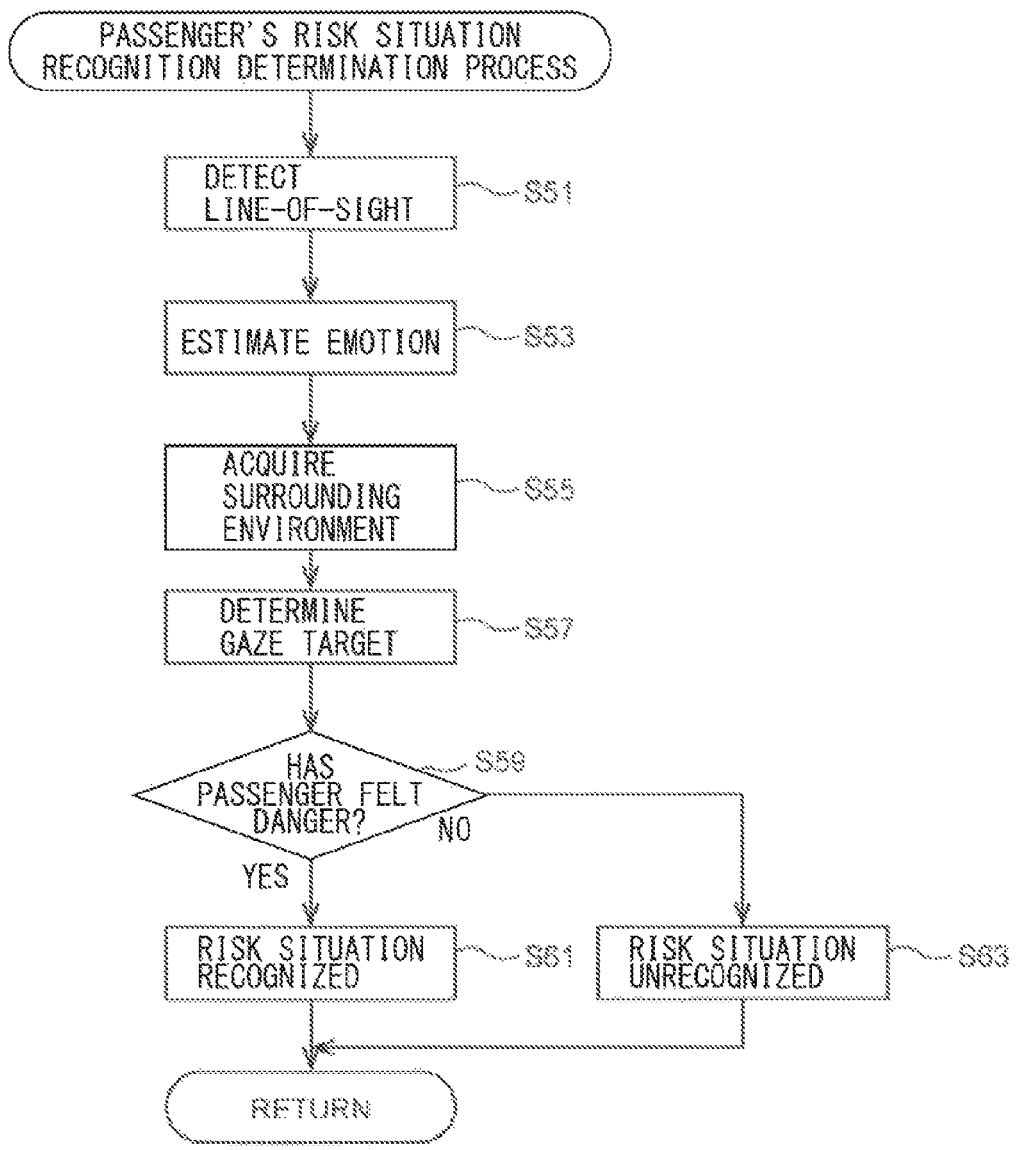
FIG. 5 is a flowchart illustrating an example of a passenger's risk situation recognition determination process performed by the driving assistance apparatus according to one example embodiment of the technology.

FIG. 5 is a flowchart illustrating an example of the passenger's risk situation recognition determination process.

First, as with step S15 described above, the passenger's line-of-sight detector 57 may detect the passenger's line-of-sight on the basis of the image data transmitted from the vehicle interior camera 21 (step S51). Thereafter, as with step S17 described above, the passenger's emotion estimating unit 59 may estimate the passenger's emotion on the basis of the image data transmitted from the vehicle interior camera 21 (step S53).

Thereafter, as with step S19 described above, the surrounding environment detector 67 may detect the vehicle surrounding environment information, on the basis of the image data transmitted from the vehicle exterior camera 23 and the information transmitted from the surrounding environment sensor 25 (step S55). Thereafter, the passenger's gaze target determining unit 73 may determine the gaze target present in the passenger's line-of-sight, on the basis of a direction of the passenger's line-of-sight detected by the passenger's line-of-sight detector 57 and the vehicle surrounding environment information detected by the surrounding environment detector 67 (step S57).

Thereafter, as with step S25 described above, the passenger's risk situation recognition determining unit 83 may determine whether the passenger has felt danger (step S59). If it is determined that the passenger has felt danger (S59/YES), the passenger's risk situation recognition determining unit 83 may determine that the passenger has recognized a risk situation (step S61), and end the routine. If it is not determined that the passenger has felt danger (S59/NO), the passenger's risk situation recognition determining unit 83 may determine that the passenger has not recognized a risk situation (step S63), and end the routine.

Returning to FIG. 4, if a determination result in step S33 is "No" (S33/NO) or after completion of the passenger's risk situation recognition determination process in step S35, the traffic participant detector 61 of the information processing device 50 may, as with step S11 described above, perform a traffic participant detection process on the basis of the image data transmitted from the vehicle exterior camera 23 (step S37). Thereafter, the traffic participant detector 61 may determine whether a traffic participant has been detected (step S39).

If it is not determined that a traffic participant has been detected (S39/NO), the information processing device 50 may cause the process to proceed to step S43. If it is determined that a traffic participant has been detected (S39/YES), the information processing device 50 may execute a traffic participant's risk situation recognition determination process (step S41).

Figure 6:
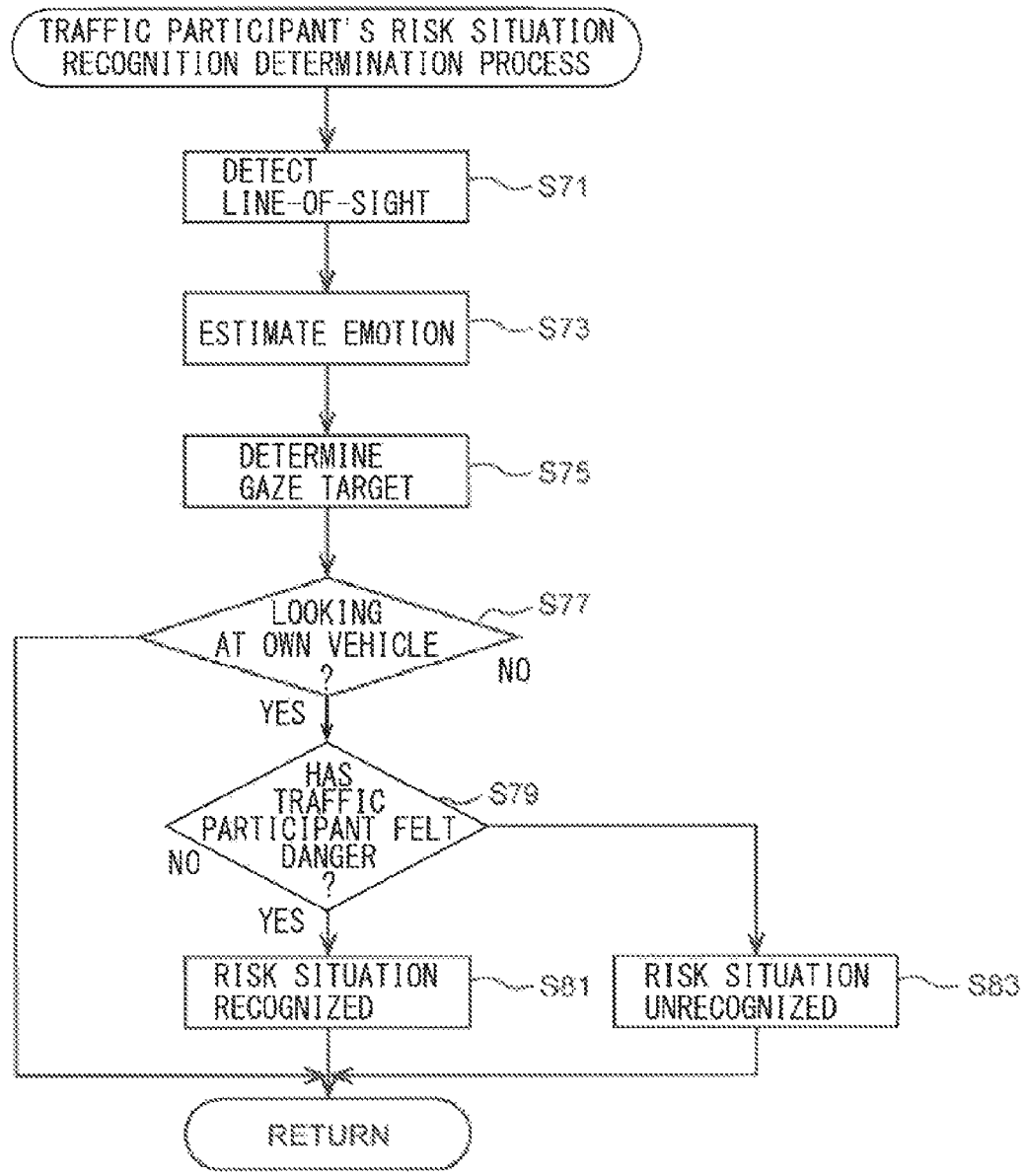
FIG. 6 is a flowchart illustrating an example of a traffic participant's risk situation recognition determination process performed by the driving assistance apparatus according to one example embodiment of the technology.

FIG. 6 is a flowchart illustrating an example of the traffic participant's risk situation recognition determination process.

First, as with step S15 described above, the traffic participant's line-of-sight detector 63 may detect the traffic participant's line-of-sight on the basis of the image data transmitted from the vehicle exterior camera 23 (step S71). Thereafter, as with step S17 described above, the traffic participant's emotion estimating unit 65 may estimate the traffic participant's emotion on the basis of the image data transmitted from the vehicle exterior camera 23 (step S73).

Thereafter, the traffic participant's gaze target determining unit 75 may determine the gaze target on the basis of a direction of the traffic participant's line-of-sight detected by the traffic participant's line-of-sight detector 63 (step S75). Thereafter, the traffic participant's risk situation recognition determining unit 85 may determine whether the detected traffic participant is looking at the own vehicle (step S77). If it is not determined that the traffic participant is looking at the own vehicle (S77/NO), the traffic participant's risk situation recognition determining unit 85 may end the routine. If it is determined that the traffic participant is looking at the own vehicle (S77/YES), the traffic participant's risk situation recognition determining unit 85 may, as with step S25 described above, determine whether the traffic participant has felt danger (step S79).

If it is determined that the traffic participant has felt danger (S79/YES), the traffic participant's risk situation recognition determining unit 85 may determine that the traffic participant has recognized a risk situation (step S81), and end the routine. If it is not determined that the traffic participant has felt danger (S79/NO), the traffic participant's risk situation recognition determining unit 85 may determine that the traffic participant has not recognized a risk situation (step S83), and end the routine.

Returning to FIG. 4, if a determination result in step S39 is "No" (S39/NO) or after completion of the traffic participant's risk situation recognition determination process in step S41, the driver-unrecognized near-miss incident location storage processor 89 may determine whether it is determined that the passenger, the traffic participant, or both has recognized a risk situation (step S43). If it is not determined that the passenger, the traffic participant, or both has recognized a risk situation (S43/NO), the driver-unrecognized near-miss incident location storage processor 89 may end the routine.

If it is determined that the passenger, the traffic participant, or both has recognized a risk situation (S43/YES), the driver-unrecognized near-miss incident location storage processor 89 may determine whether the driver has recognized the risk situation at a point in time of the recognition of the risk situation by the passenger, the traffic participant, or both (step S45). If it is determined that the driver has recognized the risk situation (S45/YES), the driver-unrecognized near-miss incident location storage processor 89 may end the routine, without causing the driver-unrecognized near-miss incident location database 93 to store the driver-unrecognized near-miss incident location. If it is not determined that the driver has recognized the risk situation (S45/NO), the driver-unrecognized near-miss incident location storage processor 89 may, on the basis of the output signal from the GPS antenna 29 and the map data storage 31, specify the traveling position of the vehicle on the map data where the passenger or the traffic participant is determined as having felt danger, and cause the driver-unrecognized near-miss incident location database 93 to store the traveling position as the driver-unrecognized near-miss incident location (step S47). The driver-unrecognized near-miss incident location storage processor 89 may cause the data on each driver-unrecognized near-miss incident location to be stored together with information on a level of the negative emotion felt by the passenger or the traffic participant.

The information processing device 50 may repeatedly execute the routine of step S31 to step S47 related to the driver-unrecognized near-miss incident location storage process described above. This enables the information processing device 50 to collect the information on the near-miss incident location where a passenger or a traffic participant other than the driver has felt danger from the own vehicle.

[2-3. Notification Control Process]

Figure 7:
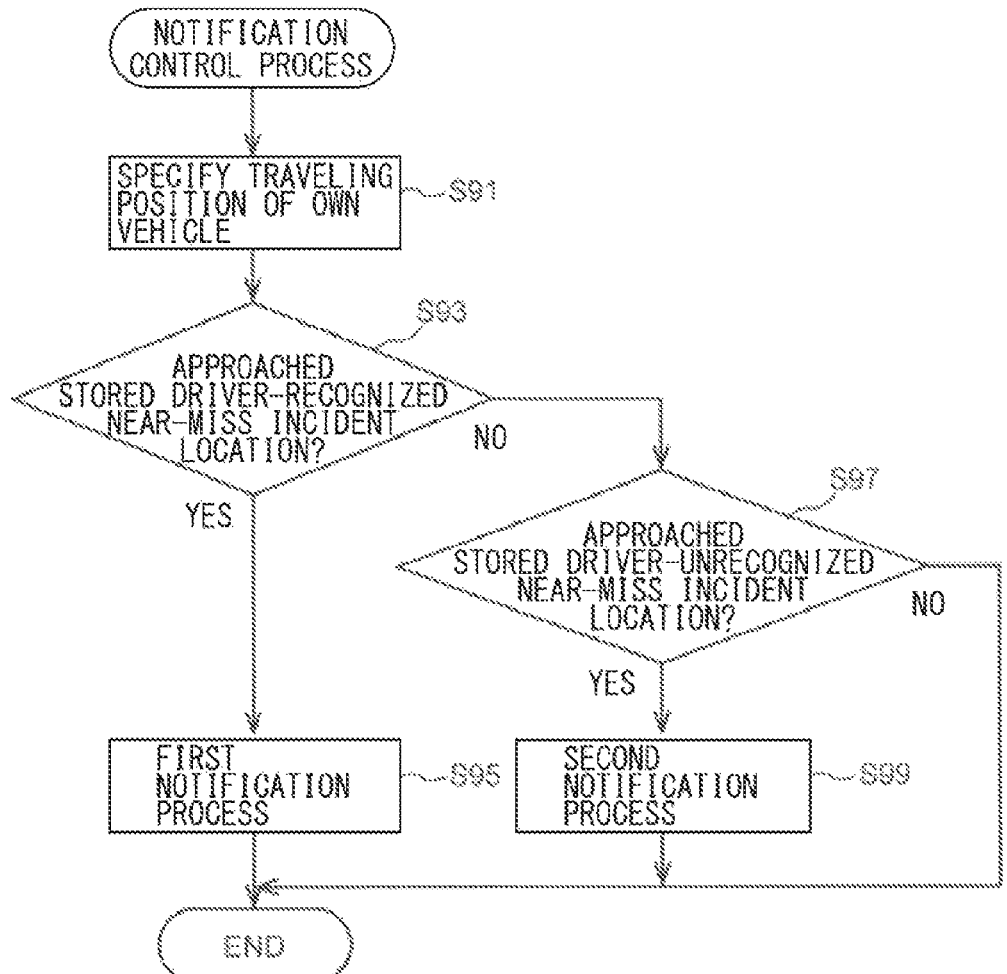
FIG. 7 is a flowchart illustrating operation of a notification control process performed by the driving assistance apparatus according to one example embodiment of the technology.

FIG. 7 is a flowchart illustrating operation of the notification control process.

First, the notification controller 95 may specify the traveling position of the own vehicle on the map data, on the basis of the position information transmitted from the GPS antenna 29 (step S91). Thereafter, the notification controller 95 may determine whether the traveling position of the own vehicle has approached the driver-recognized near-miss incident location stored in the driver-recognized near-miss incident location database 91 (step S93). For example, the notification controller 95 may determine whether a distance from the traveling position of the own vehicle to the driver-recognized near-miss incident location present ahead on a traveling route to a set destination has become a predetermined distance or less. In a case where no destination has been set, the notification controller 95 may specify the traveling position and a traveling road of the own vehicle on the map data, and determine whether a distance from the traveling position of the own vehicle to the driver-recognized near-miss incident location present ahead on the traveling road has become the predetermined distance or less. The predetermined distance may be a preset fixed value, or may be a value that varies between an ordinary road and an expressway or depending on the vehicle speed.

If it is determined that the traveling position of the own vehicle has approached the driver-recognized near-miss incident location (S93/YES), the notification controller 95 may control the driving of the HMI 43 to execute a first notification process of notifying the driver that the own vehicle is expected to pass through the driver-recognized near-miss incident location (step S95). In the first notification process, the notification controller 95 may cause voice or warning sound to be produced or cause a warning to be displayed.

If it is not determined that the traveling position of the own vehicle has approached the driver-recognized near-miss incident location (S93/NO), the notification controller 95 may determine whether the traveling position of the own vehicle has approached the driver-unrecognized near-miss incident location stored in the driver-unrecognized near-miss incident location database 93 (step S97). For example, the notification controller 95 may determine whether a distance from the traveling position of the own vehicle to the driver-unrecognized near-miss incident location present ahead on a traveling route to a set destination has become a predetermined distance or less. In a case where no destination has been set, the notification controller 95 may specify the traveling position and a traveling road of the own vehicle on the map data, and determine whether a distance from the traveling position of the own vehicle to the driver-unrecognized near-miss incident location present ahead on the traveling road has become the predetermined distance or less. The predetermined distance may be a preset fixed value, or may be a value that varies between an ordinary road and an expressway or depending on the vehicle speed.

If it is determined that the traveling position of the own vehicle has approached the driver-unrecognized near-miss incident location (S97/YES), the notification controller 95 may control the driving of the HMI 43 to execute a second notification process of notifying the driver that the own vehicle is expected to pass through the driver-unrecognized near-miss incident location (step S99). In the second notification process, the notification controller 95 may cause voice or warning sound to be produced or cause a warning to be displayed in a manner different from that in the first notification process.

The information processing device 50 may repeatedly execute the routine of step S91 to step S99 related to the notification control process described above. This enables the driver to know that the vehicle will pass through the near-miss incident location difficult for the driver him/herself to recognize, as well as the near-miss incident location recognizable by the driver him/herself. The driver is able to know the driver-recognized near-miss incident location and the driver-unrecognized near-miss incident location distinguished from each other. This enables the driver to drive the vehicle while directing more attention to avoiding a risk situation difficult for the driver him/herself to recognize. The driver being able to know the driver-recognized near-miss incident location and the driver-unrecognized near-miss incident location distinguished from each other enables the driver to know risk of driving that is difficult for the driver him/herself to recognize. This makes it possible to improve the driver's awareness of his/her driving skill.

[3. Example Configuration of Management Server]

Next, an example configuration of the management server 5 will be described.

Figure 8:
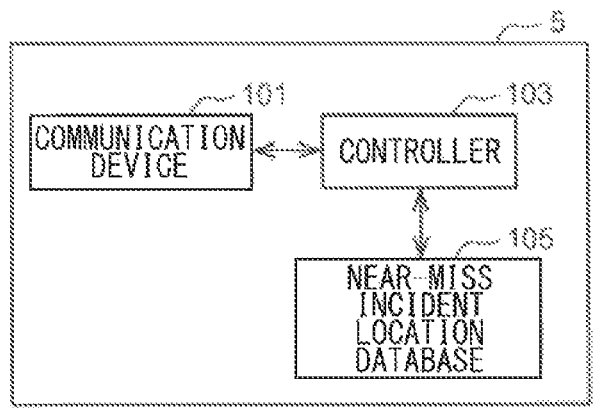
FIG. 8 is a block diagram illustrating an example configuration of a management server according to one example embodiment of the technology.

FIG. 8 is a block diagram illustrating an example configuration of the management server 5 according to an example embodiment of the technology.

The management server 5 may include a communication device 101, a controller 103, and a near-miss incident location database 105.

The communication device 101 may be an interface for communication with the driving assistance apparatus 10 mounted in each vehicle. The communication device 101 may include an interface supporting standards of a communication system. In one embodiment, the communication device 101 may serve as a "second communicator".

The near-miss incident location database 105 may include a memory, such as a RAM, serving as a storage, or a storage medium, such as a HDD, a CD, a DVD, a SSD, a USB flash drive, or a storage device. In one embodiment, the near-miss incident location database 105 may serve as a "data memory".

The controller 103 may include, for example, an arithmetic processing unit, such as a central processing unit (CPU) or a micro-processing unit (MPU), and an image processing unit, such as a graphic processing unit (GPU).

The arithmetic processing unit may execute programs stored in an unillustrated memory to conduct various kinds of calculation processes.

The controller 103 may receive the driver-recognized near-miss incident location information and the driver-unrecognized near-miss incident location information transmitted from the driving assistance apparatus 10 mounted in each of the vehicles, and cause the near-miss incident location database 105 to store the information. The controller 103 may cause the driver-recognized near-miss incident location and the driver-unrecognized near-miss incident location to be stored to be distinguishable from each other. The controller 103 may cause the driver-recognized near-miss incident location information and the driver-unrecognized near-miss incident location information to be stored together with the information on the level of the fear or surprise felt by the driver, a passenger, or a traffic participant.

The controller 103 may receive information on the traveling position of the vehicle from the driving assistance apparatus 10 of each of the vehicles. The controller 103 may extract near-miss incident location data present within a predetermined range from the received traveling position, from the near-miss incident location data stored in the near-miss incident location database 105, and transmit the extracted data to the vehicle. The controller 103 may transmit, together with the extracted data, information on a risk level for each near-miss incident location. For example, the information on the risk level may be information on the number of registrations within a predetermined period in the past, or may be information on a proportion of the number of registrations of the near-miss incident location with respect to the number of passages of all vehicles. Alternatively, the information on the risk level may be information on an average value of levels of fear or surprise felt by the driver, a passenger, or a traffic participant.

[4. Example Operation of Management Server]

Next, example operation of the management server according to the example embodiment will be described in detail. Hereinafter, the operation of the management server will be described by being broken down into a near-miss incident location storage process and a near-miss incident location information transmission process.

[4-1. Near-Miss Incident Location Storage Process]

Figure 9:
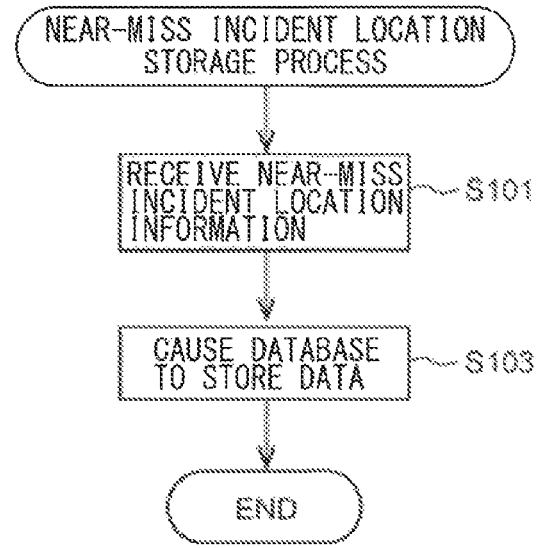
FIG. 9 is a flowchart illustrating operation of a near-miss incident location storage process performed by the management server according to one example embodiment of the technology.

FIG. 9 is a flowchart illustrating operation of the near-miss incident location storage process.

First, the controller 103 of the management server 5 may receive the near-miss incident location information transmitted from the driving assistance apparatus 10 mounted in each of the vehicles (step S101). The near-miss incident location information to be received may include the driver-recognized near-miss incident location information and the driver-unrecognized near-miss incident location information. In this case, the controller 103 may receive, together with the near-miss incident location information, the information on the level of the fear or surprise felt by the driver, a passenger, or a traffic participant at each near-miss incident location. The controller 103 may also receive identification data of the vehicle together with the near-miss incident location information.

Thereafter, the controller 103 may cause the near-miss incident location database 105 to store the received near-miss incident location information (step S103). The controller 103 may repeatedly execute step S101 to step S103 related to the near-miss incident location storage process. Thus, the driver-recognized near-miss incident location data and the driver-unrecognized near-miss incident location data collected by two or more vehicles may be accumulated in the near-miss incident location database 105 of the management server 5.

[4-2. Near-Miss Incident Location Information Transmission Process]

Figure 10:
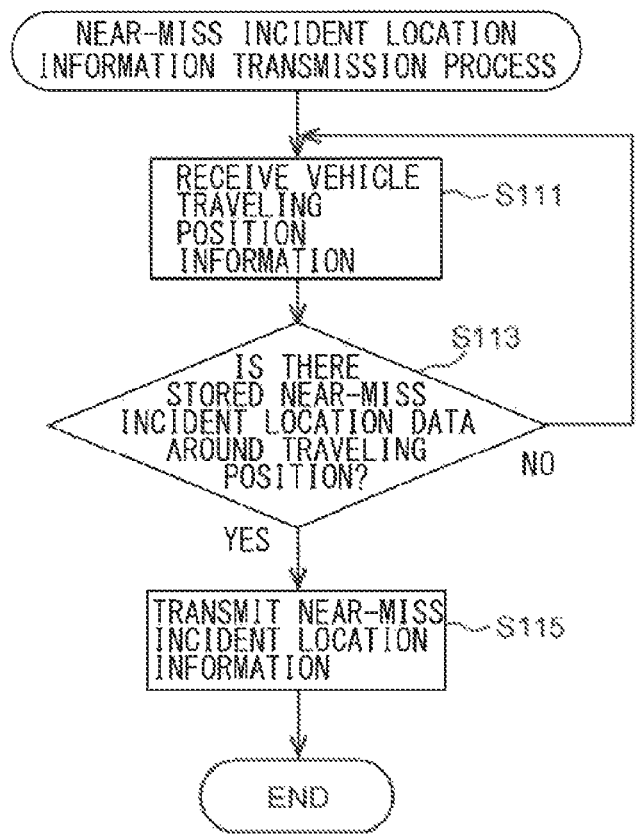
FIG. 10 is a flowchart illustrating operation of a near-miss incident location information transmission process performed by the management server according to one example embodiment of the technology.

FIG. 10 is a flowchart illustrating operation of the near-miss incident location information transmission process.

First, the controller 103 may receive the information on the traveling position of each of the vehicles from the driving assistance apparatus 10 mounted in each of the vehicles (step S111). Thereafter, the controller 103 may determine whether near-miss incident location data stored in the near-miss incident location database 105 is present around the received traveling position (step S113). For example, the controller 103 may determine whether stored near-miss incident location data is present within a preset range of the distance from the traveling position. Alternatively, the controller 103 may acquire information on a traveling direction or a traveling route to a destination of the vehicle, together with the information on the traveling position of the vehicle, and determine whether near-miss incident location data is present within a predetermined range ahead in the traveling direction.

If it is not determined that near-miss incident location data is present around the traveling position (S113/NO), the controller 103 may cause the process to return to step S111. If it is determined that near-miss incident location data is present around the traveling position (S113/YES), the controller 103 may extract the corresponding near-miss incident location, and transmit the near-miss incident location data to the driving assistance apparatus 10 of the vehicle (step S115). The controller 103 may transmit, together with the near-miss incident location data, information on the risk level for each near-miss incident location.

Figure 11:
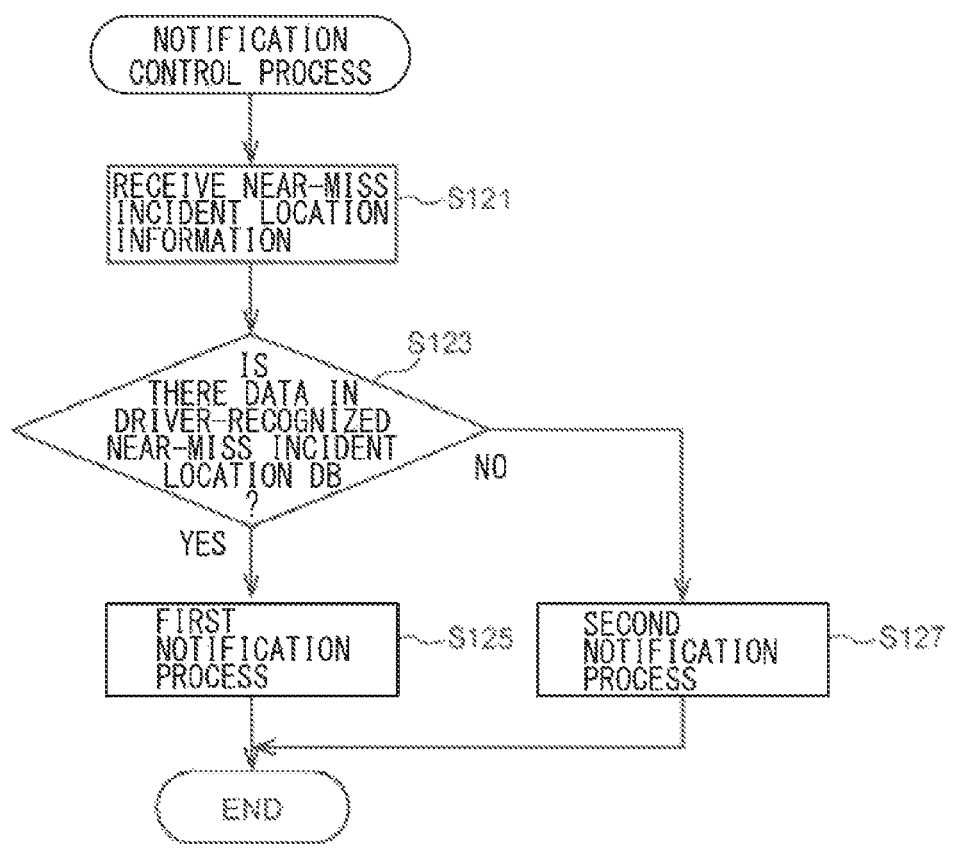
FIG. 11 is a flowchart illustrating operation of a notification control process performed by the driving assistance apparatus that has received near-miss incident location information from the management server.

FIG. 11 is a flowchart illustrating operation of the notification control process performed by the driving assistance apparatus 10 that has received the near-miss incident location information from the management server 5.

The notification controller 95 of the driving assistance apparatus 10 may receive the near-miss incident location information transmitted from the management server 5 (step S121). Thereafter, the notification controller 95 may determine whether the driver-recognized near-miss incident location data stored in the driver-recognized near-miss incident location database 91 includes the received near-miss incident location data (step S123).

If it is determined that the driver-recognized near-miss incident location data stored in the driver-recognized near-miss incident location database 91 includes the received near-miss incident location data (S123/YES), the notification controller 95 may treat the received near-miss incident location as the driver-recognized near-miss incident location, and execute the first notification process as with step S95 described above (step S125). If it is not determined that the driver-recognized near-miss incident location data stored in the driver-recognized near-miss incident location database 91 includes the received near-miss incident location data (S123/NO), the notification controller 95 may treat the received near-miss incident location as the driver-unrecognized near-miss incident location, and execute the second notification process as with step S99 described above (step S127).

This enables the driving assistance apparatus 10 to notify the driver of not only the near-miss incident location data stored in the own vehicle, but also the near-miss incident location data stored in another vehicle. This enables the driver to know the near-miss incident location where a passenger of the other vehicle or a traffic participant around the other vehicle has felt danger in relation to the travel of the other vehicle. This allows the driver to drive the vehicle while directing more attention to avoiding a risk situation difficult for the driver him/herself to recognize.

As described above, the driving assistance apparatus 10 and the data collection system 1 according to the example embodiment make it possible to collect information on a near-miss incident location where a traffic participant other than the driver of the vehicle has felt danger from the vehicle. In other words, it is possible to collect useful data information. The driving assistance apparatus 10 and the data collection system 1 according to the example embodiment also make it possible to collect information on a near-miss incident location where a passenger other than the driver of the vehicle has felt danger. This makes it possible to attract the driver's attention when the vehicle travels through a location where a situation in which it is difficult for the driver him/herself to feel danger, as well as a situation in which it is easy for the driver him/herself to feel danger, is likely to occur. This helps to reduce the possibility of occurrence of an accident, and improve the feeling of safety about traffic.

In the above description, some example embodiments and modification examples of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, although the driving assistance apparatus 10 may be configured to communicate with the management server 5 to transmit and receive the near-miss incident location information in the example embodiment described above, the technology is not limited to this example. The driving assistance apparatus 10 may not be configured to transmit and receive the near-miss incident location information to and from the management server 5, and the data collection system 1 may include only the driving assistance apparatus 10.

Each of the driver's emotion estimating unit 55, the passenger's emotion estimating unit 59, the traffic participant's emotion estimating unit 65, and the notification controller 95 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the driver's emotion estimating unit 55, the passenger's emotion estimating unit 59, the traffic participant's emotion estimating unit 65, and the notification controller 95. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the driver's emotion estimating unit 55, the passenger's emotion estimating unit 59, the traffic participant's emotion estimating unit 65, and the notification controller 95 illustrated in FIG. 1.

The invention claimed is:

1. A driving assistance apparatus comprising:
one or more processors; and
one or more memories storing instructions that, when executed by the one or more processors, cause the one or more processors to perform operations comprising:
receiving, from one or more image capturing devices of a vehicle, a first image data of a first image in which at least a driver who drives the vehicle is captured, and a second image data of a second image in which at least a traffic participant around the vehicle is captured;
executing a first image data analysis for a facial expression of the driver based on the first image data, creating a first emotion data including information of one or more types of emotion of the driver estimated based on the first image data analysis, and executing a first determination that the driver has felt danger based on the first emotion data;
executing a second image data analysis for a facial expression of the traffic participant based on the second image data, creating a second emotion data including information of the one or more types of emotion of the traffic participant estimated based on the second image data analysis, and executing a second determination that the traffic participant has felt danger based on the second emotion data;
identifying a first traveling position information of a first traveling position of the vehicle on a map using a global navigation satellite system at a time when at least executing the first determination, and transmitting the first traveling position information of the vehicle to one or more databases including data of driver-recognized near-miss locations for inserting data of the first traveling position as one of the data of the driver-recognized near-miss locations into the one or more databases;
identifying a second traveling position information of a second traveling position of the vehicle on the map using the global navigation satellite system at a time when at least executing the second determination but not executing the first determination, and transmitting the second traveling position information of the vehicle to the one or more databases including data of driver-unrecognized near-miss locations for inserting data of the second traveling position as one of the data of the driver-unrecognized near-miss locations into the one or more databases;
causing a user interface of the vehicle to execute a first notification representing a third traveling position that is one of the driver-recognized near-miss locations based on information of the driver-recognized near-miss locations received from the one or more database; and
causing the user interface of the vehicle to execute a second notification being different from the first notification and representing a fourth traveling position that is one of the driver-unrecognized near-miss locations based on information of the driver-unrecognized near-miss locations received from the one or more database.

2. The driving assistance apparatus according to claim 1, wherein the operations further comprise:
  executing a third image data analysis for a facial expression of a passenger of the vehicle other than the driver of the vehicle based on an image data, creating a third emotion data including information of the one or more types of emotion of the passenger estimated based on the third image data analysis, and executing a third determination that the passenger has felt danger based on the third emotion data; and
  identifying a fifth traveling position information of a fifth traveling position of the vehicle on the map using the global navigation satellite system at a time when at least executing the third determination but not executing the first determination, and transmitting the fifth traveling position information of the vehicle to the one or more databases for inserting data of the fifth traveling position as one of the data of the driver-unrecognized near-miss locations into the one or more databases.

3. The driving assistance apparatus according to claim 1, further comprising:
  the one or more image capturing devices comprising: a first image capturing device that includes a first image sensor and is configured to create the first image data; and a second image capturing device that includes a second image sensor and is configured to create the second image data,
  the global navigation satellite system that includes an antenna receivable satellite signals and is configured to obtain position information of the vehicle, and
  the user interface that includes a display screen or a speaker and is configured to notify information to the driver.

4. The driving assistance apparatus according to claim 1, wherein:
  each of the first image data analysis and the second image data analysis includes an image data analysis based on facial action coding system (FACS) theory,
  the one or more types of emotion represent one or more negative emotions indicating at least one of fear or surprise, and
  the first determination is executed based in a case where the one or more negative emotions are estimated based on the first image data; and the first determination is not executed in a case where the one or more negative emotions are not estimated based on the first image data.

5. The driving assistance apparatus according to claim 1, wherein:
  the first notification is executed by the user interface based on a determination that a distance between the vehicle and the third traveling position is a predetermined distance or less, and
  the second notification is executed by the user interface based on a determination that a distance between the vehicle and the fourth traveling position is a predetermined distance or less.

6. A data collection system comprising:
  a driving assistance apparatus mounted in a vehicle; and
  a management server configured to communicate with the driving assistance apparatus, and including a non-transitory computer readable storage configured to store one or more databases, wherein
  the driving assistance apparatus comprises:
  one or more processors; and
  one or more memories storing instructions that, when executed by the one or more processors, cause the one or more processors to perform operations comprising:
  receiving, from one or more image capturing devices of the vehicle, a first image data of a first image in which at least a driver who drives the vehicle is captured, and a second image data of a second image in which at least a traffic participant around the vehicle is captured;
  executing a first image data analysis for a facial expression of the driver based on the first image data, creating a first emotion data including information of one or more types of emotion of the driver estimated based on the first image data analysis, and executing a first determination that the driver has felt danger based on the first emotion data;
  executing a second image data analysis for a facial expression of the traffic participant based on the second image data, creating a second emotion data including information of the one or more types of emotion of the traffic participant estimated based on the second image data analysis, and executing a second determination that the traffic participant has felt danger based on the second emotion data;
  identifying a first traveling position information of a first traveling position of the vehicle on a map using a global navigation satellite system at a time when at least executing the first determination, and transmitting the first traveling position information of the vehicle to the one or more databases of the management server including data of driver-recognized near-miss locations for inserting data of the first traveling position as one of the data of the driver-recognized near-miss locations into the one or more databases;
  identifying a second traveling position information of a second traveling position of the vehicle on the map using the global navigation satellite system at a time when at least executing the second determination but not executing the first determination, and transmitting the second traveling position information of the vehicle to the one or more databases of the management server including driver-unrecognized near-miss locations for inserting data of the second traveling position as one of the data of the driver-unrecognized near-miss locations into the one or more databases,
  causing a user interface of the vehicle to execute a first notification representing a third traveling position that is one of the driver-recognized near-miss locations based on information of the driver-recognized near-miss locations received from the one or more database of the management server; and
  causing the user interface of the vehicle to execute a second notification being different from the first notification and representing a fourth traveling position that is one of the driver-unrecognized near-miss locations based on information of the driver-unrecognized near-miss locations received from the one or more database of the management server.

7. The data collection system according to claim 6, wherein the operations further comprise:
  executing a third image data analysis for a facial expression of a passenger of the vehicle other than the driver of the vehicle based on an image data, creating a third emotion data including information of the one or more types of emotion of the passenger estimated based on the third image data analysis, and executing a third determination that the passenger has felt danger based on the third emotion data, and identifying a fifth traveling position information of a fifth traveling position of the vehicle on the map using the global navigation satellite system at a time when at least executing the third determination but not executing the first determination, and transmitting the fifth traveling position information of the vehicle to the one or more databases for inserting data of the fifth traveling position as one of the data of the driver-unrecognized near-miss locations into the one or more databases.

8. The data collection system according to claim 6, wherein the driving assistance apparatus further comprises the one or more image capturing devices comprising: a first image capturing device that includes a first image sensor and that is configured to create the first image data; and a second image capturing device that includes a second image sensor and is configured to create the second image data, the global navigation satellite system that includes an antenna receivable satellite signals and is configured to obtain position information of the vehicle, and the user interface that includes a display screen or a speaker and is configured to notify information to the driver.

9. The data collection system according to claim 6, wherein:

each of the first image data analysis and the second image data analysis includes an image data analysis based on FACS theory, the one or more types of emotion represents one or more negative emotions indicating at least one of fear and surprise, and the first determination is executed in a case where the one or more negative emotions are estimated based on the first image data; and the first determination is not executed in a case where the one or more negative emotions are not estimated based on the first image data.

10. The data collection system according to claim 6, wherein:

the first notification is executed by the user interface based on a determination that a distance between the vehicle and the third traveling position is a predetermined distance or less, and the second notification is executed by the user interface based on a determination that a distance between the vehicle and the fourth traveling position is a predetermined distance or less.

* * * * *